US010635584B2

(12) United States Patent
Widder et al.

(10) Patent No.: US 10,635,584 B2
(45) Date of Patent: Apr. 28, 2020

(54) SYSTEM AND METHOD FOR HOST SYSTEM MEMORY TRANSLATION

(71) Applicant: Western Digital Technologies, Inc., San Jose, CA (US)

(72) Inventors: Eyal Widder, Hod Hasharon (IL); Michael Ionin, Nes Tziona (IL); Judah Hahn, Ofra (IL); Daniel Yerushalmi, Ra'anana (IL); Alexey Skidanov, Ashdod (IL)

(73) Assignee: Western Digital Technologies, Inc., San Jose, CA (US)

( * ) Notice: Subject to any disclaimer, the term of this patent is extended or adjusted under 35 U.S.C. 154(b) by 151 days.

(21) Appl. No.: 15/637,344

(22) Filed: Jun. 29, 2017

(65) Prior Publication Data

US 2019/0004944 A1  Jan. 3, 2019

(51) Int. Cl.
*G06F 12/00* (2006.01)
*G06F 12/02* (2006.01)
*G06F 12/1009* (2016.01)
*G06F 13/16* (2006.01)

(52) U.S. Cl.
CPC ...... *G06F 12/0292* (2013.01); *G06F 12/1009* (2013.01); *G06F 13/16* (2013.01)

(58) Field of Classification Search
None
See application file for complete search history.

(56) References Cited

U.S. PATENT DOCUMENTS

| | | |
|---|---|---|
| 2010/0262799 A1 | 10/2010 | Lasser et al. |
| 2011/0296088 A1 | 12/2011 | Duzly et al. |
| 2014/0129761 A1* | 5/2014 | Kwon ................ G06F 12/0246 711/103 |
| 2015/0058535 A1 | 2/2015 | Lasser |
| 2015/0143029 A1 | 5/2015 | Sivasankaran et al. |
| 2016/0239373 A1 | 8/2016 | Shah et al. |
| 2017/0262365 A1* | 9/2017 | Kanno ................... G06F 12/06 |

* cited by examiner

*Primary Examiner* — Jason W Blust
(74) *Attorney, Agent, or Firm* — Brinks Gilson & Lione

(57) ABSTRACT

Systems and methods for host system memory translation are disclosed. The memory system may send a logical-to-physical address translation table to the host system. Thereafter, the host system may send commands that include a logical address and a physical address (with the host system using the logical-to-physical address translation table previously sent to generate the physical address). After sending the table to the host system, the memory system may monitor changes in the table, and record these changes in an update table. The memory system may use the update table in determining whether to accept or reject the physical address sent from the host system in processing the host system command. In response to determining to reject the physical address, the memory system may internally generate the physical address using the logical address sent from the host system and a logical-to-physical address translation table resident in the memory system.

19 Claims, 10 Drawing Sheets

SYSTEM AND METHOD FOR HOST SYSTEM MEMORY TRANSLATION

BACKGROUND

Managed storage devices often include memories and a controller (e.g., a flash memory and a flash controller). The controller may include a microprocessor that executes management software, which may maintain a database of several tables.

One such table is a logical-to-physical address translation table. In particular, in response to receipt of a logical address from a host device, the flash management software may use the logical-to-physical address translation table in order to obtain the physical address within the memory (e.g., address translation from a logical block number to a physical block number). In this regard, the address translation process may use the logical-to-physical address translation table to convert the host device data access requests to the actual flash access requests.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION

Overview

Figure 1A:
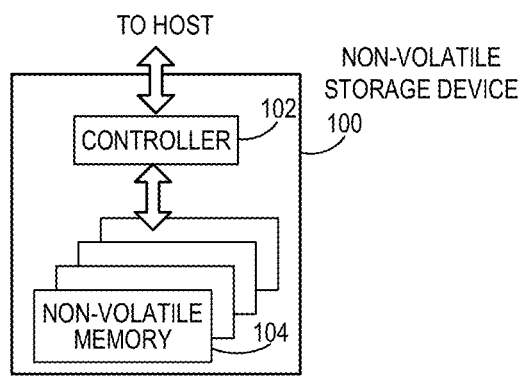
FIG. 1A is a block diagram of an exemplary non-volatile memory system.

By way of introduction, the below relates to logical-to-physical translation of addresses when accessing data in a memory system. In memory addressing, different devices may use different types of addresses when referring to memory. One type of address is a logical address, which is typically the address at which the memory appears to reside from the perspective of an application program executing on the host system. Another type of address is a physical address, which can be different from the logical address and is the address that correlates to the physical location in memory. In this way, applications that reside on the host system may operate using logical addresses without the need to know the actual physical addresses in memory. In order to account for the different types of addresses, a logical-to-physical address translation table may be used to perform the translation from a logical address to a physical address. Other memory management table constructs, in addition to the logical-to-physical address translation table, are contemplated.

In one implementation, the memory system sends a copy of the logical-to-physical address translation table (or other type of file management table, such as a memory management data construct) to the host system. In one specific implementation, the trigger for the memory system to send the copy of the logical-to-physical address translation table to the host system is based solely on a determination by the memory system and is not based at all on the host system. In another specific implementation, the host system requests the logical-to-physical address translation table from the memory system, and responsive to the request (and without any analysis by the memory system), the memory system sends the logical-to-physical address translation table to the host system. For example, the host system may send a command to the memory system to send the logical-to-physical address translation table to the host system. In still another specific implementation, the host system requests the logical-to-physical address translation table from the memory system, and responsive to the request, the memory system determines whether to send the logical-to-physical address translation table to the host system.

In operation, the logical-to-physical address translation table will be updated due to internal and external operations, as discussed below. Thus, the copy of the logical-to-physical address translation table will be incorrect due to operations that are performed subsequent to sending the copy of the logical-to-physical address translation table to the host system. In this regard, the memory system may monitor these operations after sending the copy to the host system to determine which parts of the translation table sent to the host are incorrect. In a first specific implementation, the memory system uses a separate table, such as an update table (or other type of memory management update data construct), that is separate from the logical-to-physical address translation table and indicates which parts of the table (e.g., which sections of memory) have been updated so that those parts of the copy of the logical-to-physical address translation table to the host system are no longer valid. In a second specific implementation, the memory system may use an update table that is integrated with or on top of the logical-to-physical address table. As discussed in more detail below, the update table may comprise an indicator of change(s) in the copy of the logical-to-physical address translation table resident on the host system from the logical-to-physical address translation table resident on the memory system.

In operation, the host system may send a command to the memory system. The command may include a logical address (or set of logical addresses). Alternatively, or in addition, the command may include a physical address (or a set of physical addresses), or other type of memory management input. In particular, the host system may use the copy of the logical-to-physical address translation table received from the memory system to generate a specific physical address (or set of specific physical addresses) that are included in the command (and may also include a specific logical address (or set of specific logical addresses).

The memory system may receive the command from the host system, and process the physical address (or the set of physical addresses) included therein. In one implementation, the memory system may access the update table (or the information integrated with the logical-to-physical address translation table to indicate whether copy of the logical-to-physical address translation table sent to the host system is no longer valid) in order to determine whether to accept or reject the physical address (or the set of physical addresses) included in the command. For example, the controller of the memory system may review the update table (which is either integrated with or separate from the logical-to-physical address translation table) to determine whether the physical address (or the set of physical addresses) is in a section of memory where the logical-to-physical address translation table has been updated. If the physical address (or the set of physical addresses) is in a section of memory where the logical-to-physical address translation table has been updated, the controller accesses the logical address included in the command, and performs the logical-to-physical address translation itself using the logical-to-physical address translation table stored within the memory system (e.g., the memory system generates the physical address). For example, the memory device may access internal file management data (e.g., internal to the memory device), such as the logical-to-physical address translation table internal to the memory device. If the physical address (or the set of physical addresses) is not in a section of memory where the logical-to-physical address translation table has been updated (e.g., indicative of no change), the controller uses the physical address included in the command in order to perform the command. In this way, using the update table may enable the memory system to more quickly determine whether or not to use the physical address sent from the host system.

In the example where a set of physical addresses are sent, in one implementation, the memory system may analyze each physical address in the set. In an alternative implementation, the memory system may analyze fewer than all of the physical addresses in the set.

In addition to sending the table to the host system, the memory system may send a part of an updated logical-to-physical address translation table (e.g., to replace part of the logical-to-physical address translation table previously sent). Alternatively, the memory system may send an entire updated logical-to-physical address translation table (e.g., to entirely replace the logical-to-physical address translation table previously sent). As discussed above, parts of the logical-to-physical address translation table resident on the host system may become invalid. In this regard, either the memory system, the host system, or both the memory system may determine to send an update of part or all of the logical-to-physical address translation table. In one implementation, the memory system may determine, without any input from the host system, to send an update of part or all of the logical-to-physical address translation table. For example, the memory system may analyze the update table to determine the extent of differences between the current copy of the logical-to-physical address translation table resident in the memory system and the current copy of the logical-to-physical address translation table resident in the host system. In response to this analysis, the memory system may send an update (such as an update to part or all of the logical-to-physical address translation table). In another implementation, the host system may determine to request an update of part or all of the logical-to-physical address translation table without any input from the memory system. For example, the host system may periodically request an update based on a predetermined number of hardware cycles since the last receipt of the table. Responsive to this determination, the host system may send a request to the memory system to send the table. In still another implementation, the host system and the memory system may determine in combination whether to send an update. For example, the host system may request the memory system to perform an analysis whether to send an update. Responsive thereto, the memory system may perform the analysis and decide whether to send an update.

In this regard, the update may be synchronous or asynchronous with operations of the host system. In practice, the memory system may send the update table asynchronously without the host system being notified. For example, with a PCIe interface, the host system may notify the memory system of a section of host memory that the table is to reside. The memory system may write the original table to the section of host memory. Thereafter, the memory system may write to that section of memory in the host system (such as by using a transport layer packet) without formal notification to the host system in order to update part or all of the table resident in that section of memory on the host system. In this regard, the host system may access the updated table without knowledge that the table has been updated. Conversely, the host system may request the update via the eMMC interface to send an update of the table. Responsive thereto, the memory system may send the update table to the host system for the host system to update its own memory.

Further, the discussion below describes the memory system sending a copy of the logical-to-physical address translation table to the host system, with the host system using the copy for further processing. Alternatively, or in addition, the memory system may send to the host system copies of other tables or data structures or constructs (such as other file management table(s)) used by the memory system to perform internal processing (separate from logical to physical address translation). In particular, the host system may receive these other table(s) or data structure(s) in order for the host system to perform the internal processing that is ordinarily performed by the memory system. The host system may use these other table(s) or data structure(s) in order to generate management data (such as file management data) to send to the memory system. In this regard, the discussion below regarding the logical-to-physical address translation table (including the use by the host system and the review by the memory system of the product of the use by the host system (e.g., the physical address included in the command)) may be applied to other table(s) or data construct(s) and to other processes typically performed by the memory system. In one implementation, the host system may receive a logical address table for a purpose other than address translation. For example, the memory system may send a logical address table that correlates logical addresses to meta data, such as read parameters. This meta data is typically monitored by and within the memory system. However, in this context, the host system sends this meta data, along with logical addresses, to the memory system. In response to receipt of the meta data, the memory system may determine whether to accept or reject the meta data sent by the host system. For example, the memory system may determine whether the meta data is invalid (e.g., the memory system has monitored to determine that there has been a change in the table), and if so, reject the meta data sent from the host; alternatively, the memory system may accept and use the meta data (e.g., after determining that there has been no change in the table) in performing the command sent from the host system (such as using the meta data to perform a read command sent by the host system). Other implementations are possible, and each of the implementations can be used alone or together in combination. Accordingly, various implementations will not be described with reference to the attached drawings.

EXEMPLARY IMPLEMENTATIONS

The following implementations describe non-volatile memory systems and related methods for logical-to-physical address translation. Before turning to these and other implementations, the following paragraphs provide a discussion of exemplary non-volatile memory systems and storage modules that can be used with these implementations. Of course, these are just examples, and other suitable types of non-volatile memory systems and/or storage modules can be used.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host needs to read data from or write data to the flash memory, it will communicate with the flash memory controller. In one embodiment, if the host provides a logical address to which data is to be read/written, the flash memory controller can convert the logical address received from the host to a physical address in the flash memory. Alternatively or in addition, as discussed in more detail below, the host can provide the physical address. In this regard, the flash memory controller may evaluate whether to use the physical address provided by the host. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory system 100 may be a card based system, such as a secure digital (SD) or a micro secure digital (micro-SD) card. In an alternate embodiment, the non-volatile memory system 100 may be part of an embedded memory system.

Although in the example illustrated in FIG. 1A, the non-volatile memory system 100 may include a single channel between the controller 102 and the non-volatile memory die(s) 104, the subject matter described herein is not limited to having a single memory channel. For example, in some NAND memory system architectures, 2, 4, 8 or more NAND channels may exist between the controller and the NAND memory die(s) 104, depending on controller capabilities. In any of the implementations described herein, more than a single channel may exist between the controller and the memory die(s) 104, even if a single channel is shown in the drawings.

Figure 1B:
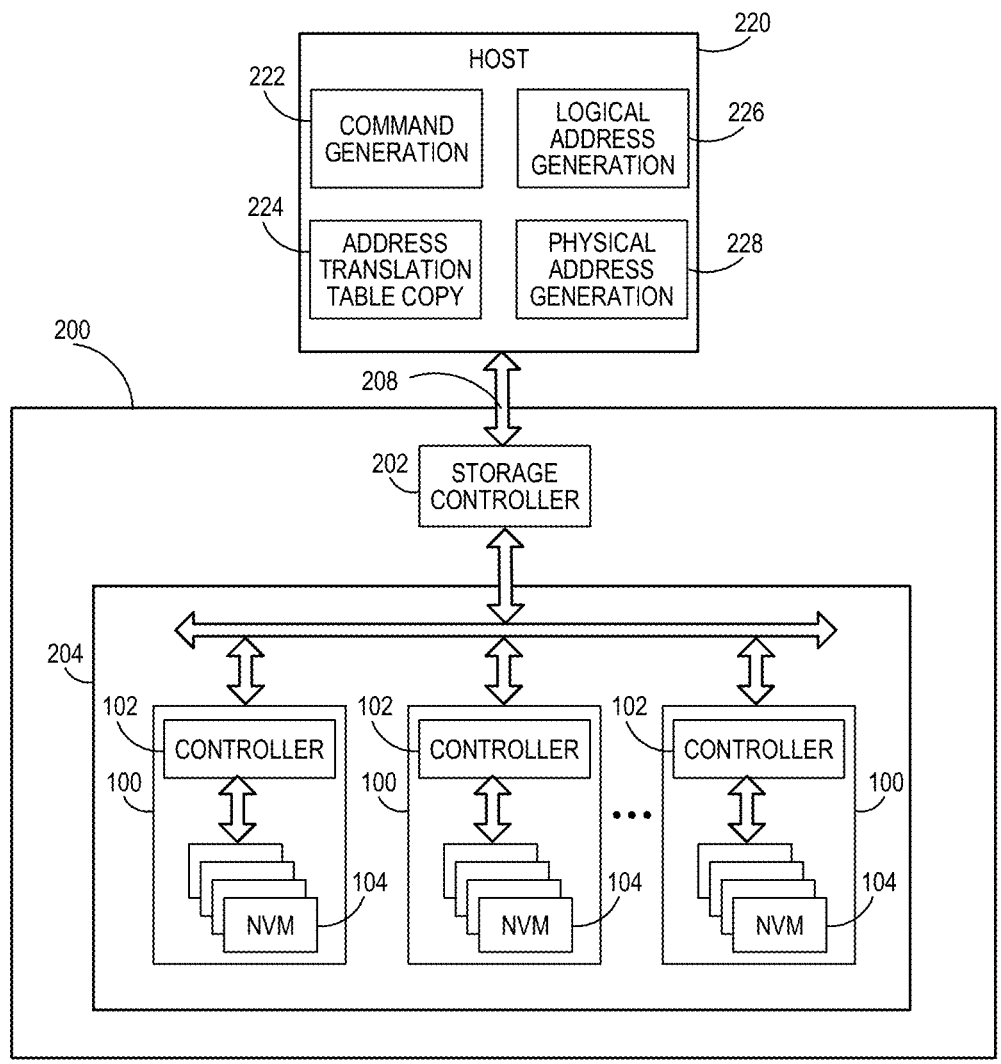
FIG. 1B is a block diagram of a storage module that includes a plurality of non-volatile memory systems and a host.

FIG. 1B illustrates a storage module 200 that includes plural non-volatile memory systems 100. As such, the storage module 200 may include a storage controller 202 that, via communication interface 208, interfaces with a host 220 and with a storage system 204, which includes a plurality of non-volatile memory systems 100. In this regard, the communication interface 208 may be configured to transmit information, such as a copy of a file management table, and/or may be configured to receive information, such as a command from the host device. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage module 200, in one embodiment, may be a solid state drive (SSD), such as found in portable computing devices, such as laptop computers and tablet computers, and mobile phones.

Host 220 may include command generation circuitry 222, address translation table copy 224, logical address circuitry 226, and physical address generation circuitry 228. In one embodiment, command generation circuitry 222 may include the software and/or hardware configured to generate a command for transmission by host 220 to storage system 204. Alternatively, the memory system may send the table to the host 220 unprompted. As discussed in more detail below, storage system 204 may send a copy of the logical-to-physical address translation table, which may be stored in address translation table copy 224. In one implementation, the storage system 204 may send the copy of the logical-to-physical address translation table in response to a request from the host 220. As one example, the host 220 may periodically send a command to the storage system 204, with the command indicative to the storage system 204 to send the copy of the logical-to-physical address translation table to the host 220. In another implementation, the storage system 204 may send the copy of the logical-to-physical address translation table in response to an internal decision by the storage system 204 to send the copy. As one example, the storage system 204 may include a clock to measure time or other type of measurement metric (such as a number of memory cycles). Alternatively, the host may provide timestamps or a clock signal used to measure time, and this may be used to measure a time-to-live for each segment of the translation table. In response to the storage system 204 determining that the time (as measured by the clock since the previous transmission of the copy to the host) or that the number of cycles (as measured by counting the number of memory cycles since the previous transmission of the copy to the host) has exceeded a threshold, the storage system 204 may send a current copy of the logical-to-physical address translation table to the host 220.

Further, the command may include a logical address and a physical address, which may be generated, respectively, by logical address generation circuitry 226 and physical address generation circuitry 228. In one specific embodiment, physical address generation circuitry 228 may use the copy of the logical-to-physical address translation table and the logical address generated by logical address generation circuitry 226 in order to generate the physical address. In this regard, the storage system 204 may generate the physical address. A host similar to that depicted in FIG. 1B may operate in combination with storage system 204. Alternatively, a host similar to that depicted in FIG. 1A may operate in combination with non-volatile memory system 100.

Figure 1C:
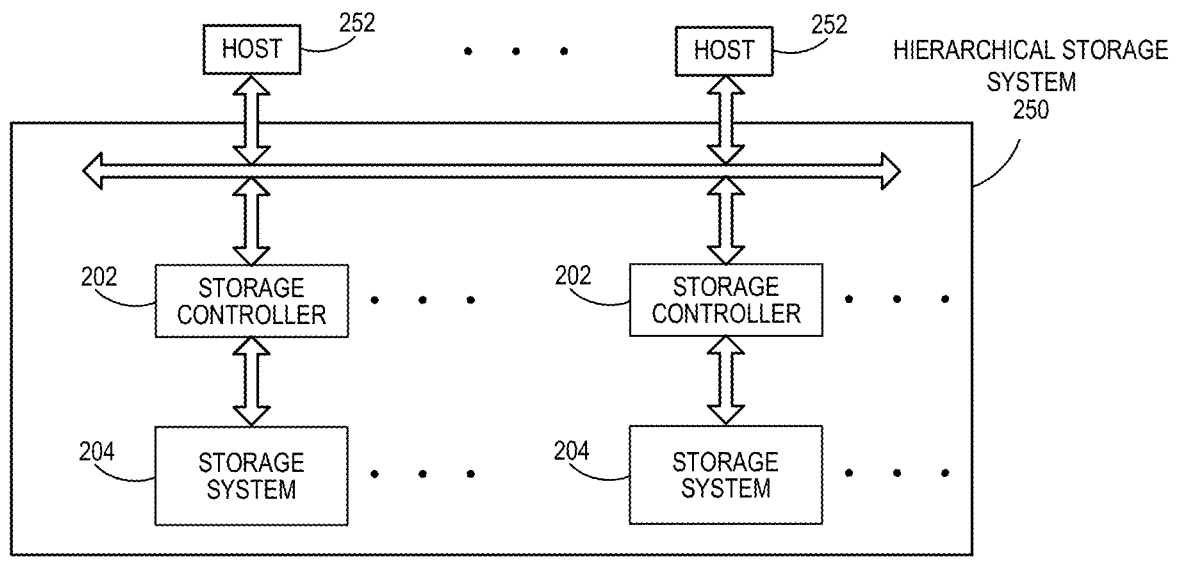
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
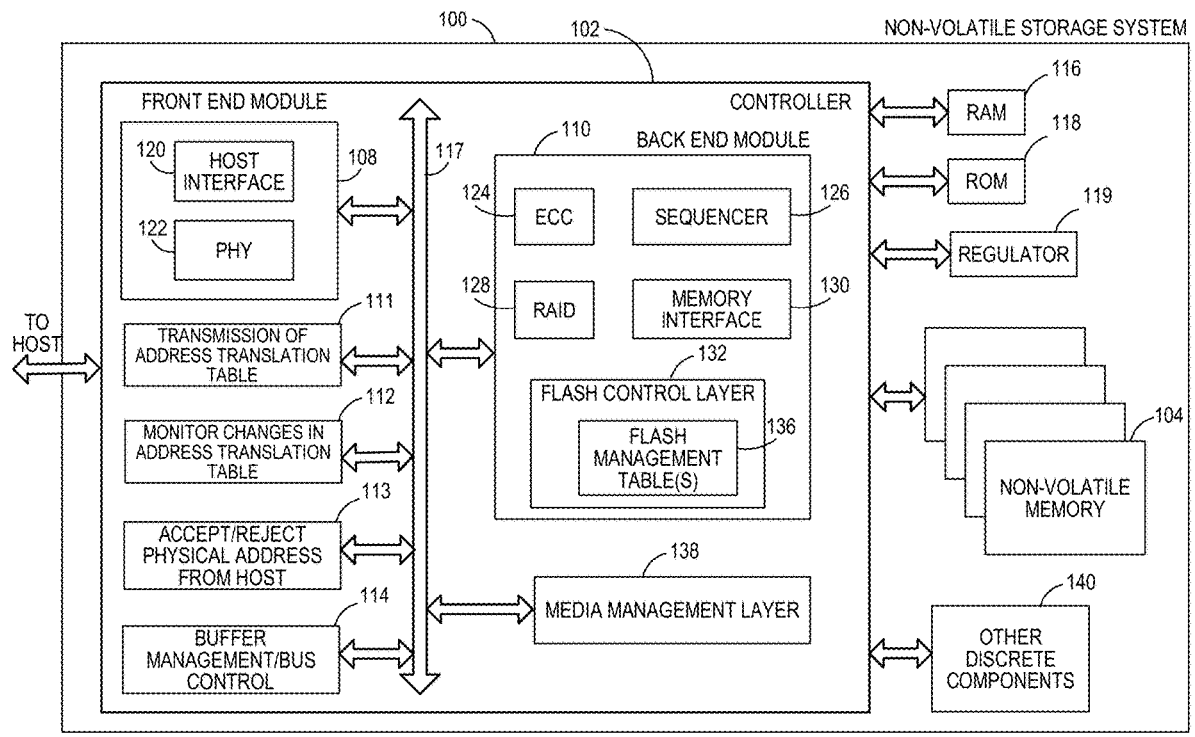
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other implementations one or both of the RAM 116 and the ROM 118 may be located within the controller 102. In yet other implementations, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of non-volatile memory system 100. FIG. 2A illustrates flash management table(s) 136 resident in flash control layer 132. The flash management table(s) 136 may comprise local flash management table(s) (such as local address translation table(s)) and may be resident in other parts of controller 102. One type of management table includes the logical-to-physical address mapping table.

The logical-to-physical address mapping table may be resident in different parts of non-volatile storage system 100. As one example, the logical-to-physical address mapping table may be resident in SRAM. In another implementation, the logical-to-physical address mapping table may be resident in a buffer controller memory buffer within controller 102 or in RAM 116. In still another implementation, the logical-to-physical address mapping table may be resident in non-volatile memory 104. The size of the logical-to-physical address mapping table may determine where the table is stored. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory system 100 illustrated in FIG. 2A may include a media management layer 138, which performs wear leveling of memory cells of the non-volatile memory die 104. The non-volatile memory system 100 may also include other discrete components 140, such as external electrical interfaces, external RAM, resistors, capacitors, or other components that may interface with controller 102. In alternative implementations, one or more of the RAID module 128, media management layer 138 and buffer management/bus controller 114 are optional components that may not be necessary in the controller 102.

Other modules of the non-volatile memory system 100 illustrated in FIG. 2A may include transmission of address translation table module 111, monitor changes in address translation table module 112, and accept/reject physical address from host module 113. These modules are shown as separate from the other modules of the non-volatile memory system 100, although in other configurations, one or more of them may be part of any of the other modules.

As discussed in more detail below, the memory system may send a copy of one or more tables used by the media management layer of the controller 102. One such table is the logical-to-physical address translation table. Transmission of address translation table module 111 may determine when the controller 102 is to transmit the logical-to-physical address translation table to the host. In this regard, transmission of address translation table module 111 may comprise address translation transmission circuitry configured to transmit an address translation table to a host device. In addition, controller 102 may include one or more data constructs to monitor changes to the logical-to-physical address translation table resident in non-volatile storage system 100 since transmission of the copy of the logical-to-physical address translation table to the host system. As one example, monitor changes in address translation table module 112 may create and/or modify an update table which correlates sections of memory to an indicator that indicates whether or not an update to the logical-to-physical address translation table associated with a respective section of memory has occurred. Thus, monitor changes in address translation table module 112 may comprise update table circuitry configured to update a data structure based on monitored changes in the address translation table since transmission to the host device.

Accept/reject physical address 113 from host module may use the update table to determine whether the respective section of memory (which includes the physical address sent from the host) has occurred. In response to accept/reject physical address module 113 determining that the respective section of memory, which includes the physical address sent from the host, has been updated (and thus that the copy of the logical-to-physical address translation table is outdated), accept/reject physical address module 113 may access the logical-to-physical address translation table stored within non-volatile storage system 100, and using logical address sent from the host and the accessed translation table, determine the physical address. In response to accept/reject physical address module 113 determining that the respective section of memory, which includes the physical address sent from the host, has not been updated (and thus that the copy of the logical-to-physical address translation table is not outdated), accept/reject physical address module 113 may use the physical address sent from host. In this regard, accept/reject physical address 113 may comprise specific physical address circuitry configured to determine whether to use the specific physical address in the command.

Figure 2B:
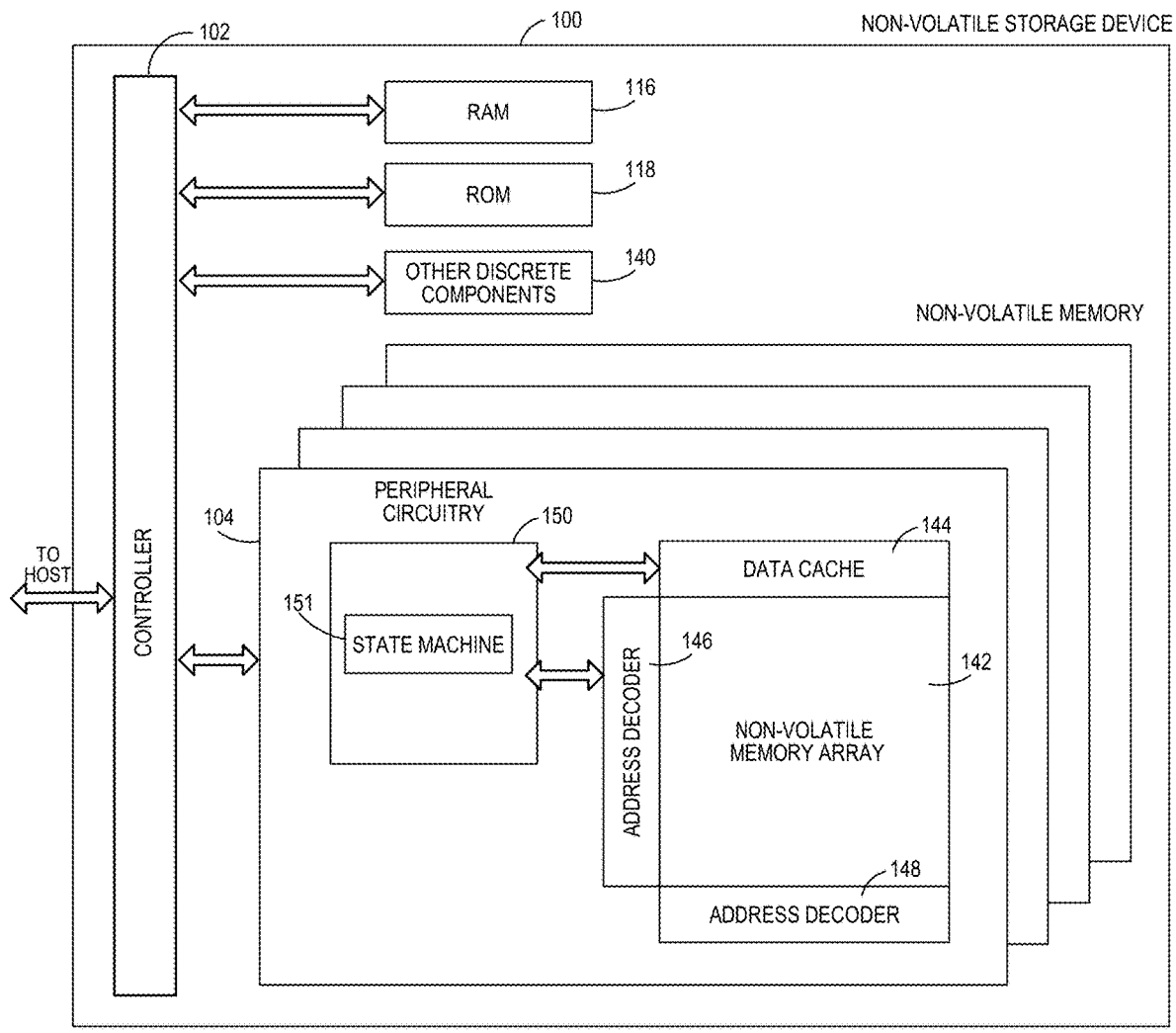
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3A:
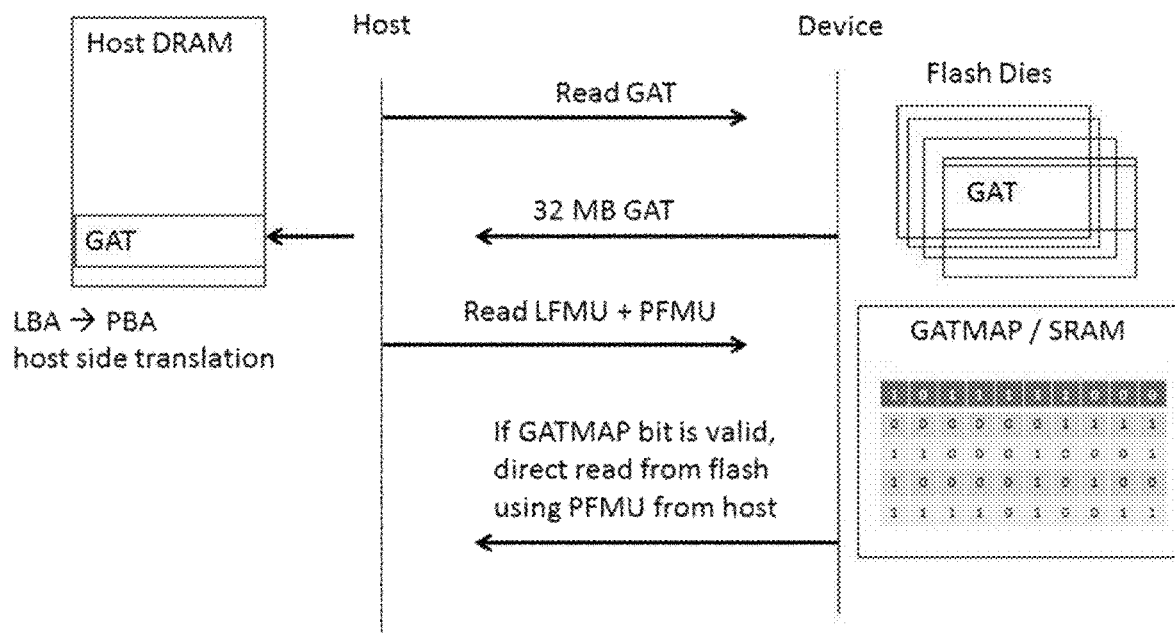
FIG. 3A is a block diagram of host side translation read flow diagram with a valid logical-to-physical translation table.
Figure 3B:
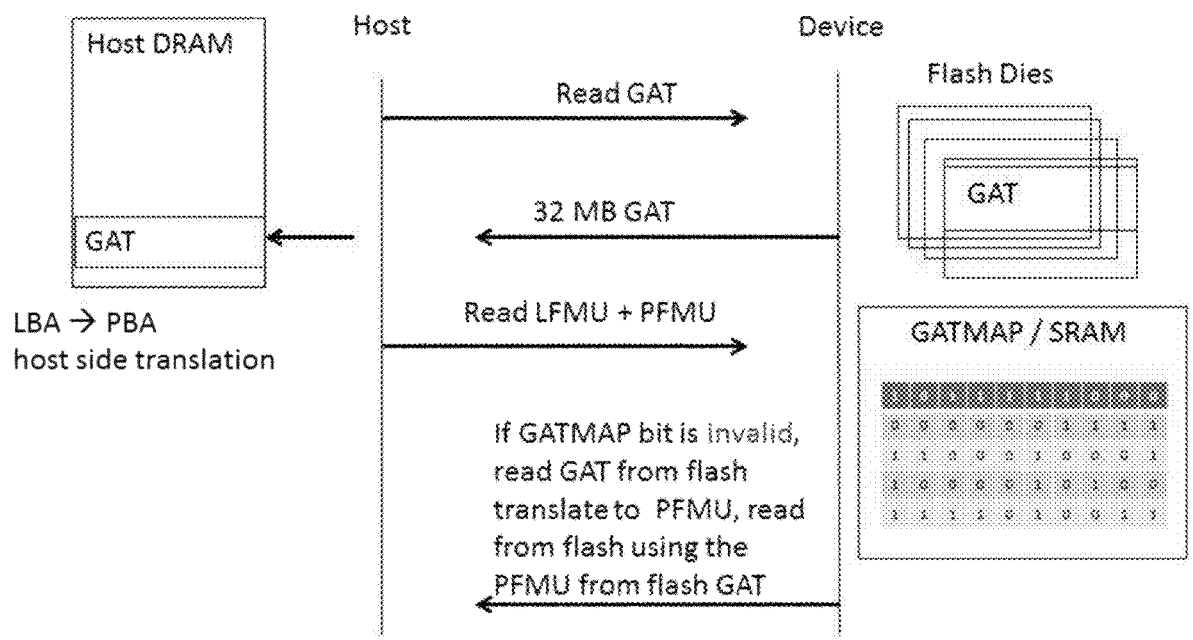
FIG. 3B is a block diagram of host side translation read flow diagram with an invalid logical-to-physical translation table.

FIG. 3A is a block diagram of host side translation read flow diagram with a valid logical-to-physical translation table. FIG. 3B is a block diagram of host side translation read flow diagram with an invalid logical-to-physical translation table. In one embodiment, the host system is configured to receive from the memory system a copy of the full Group Address Table (GAT). The GAT may be used to store a mapping of the metablock addresses for each logical group within the memory system. Further, the GAT may be stored in various places in memory on the host, such as in DRAM or the host memory buffer (HMB). In one embodiment, the memory system sends the GAT to the host system only once during electrical connection of the memory system to the host system. Alternatively, the memory system sends the GAT periodically to the host system during electrical connection of the memory system to the host system. In this regard, sending the GAT to the host system enables leveraging of the abundance of RAM in the host system in order to create quicker logical-to-physical address translation at the host system.

After the GAT is sent to the host system, the memory system may maintain a data construct indicating whether parts of the GAT sent to the host system are valid or invalid. For example, the flash controller in the memory system may be configured to invalidate bits in a GAT bitmap according to operations which may modify the GAT, such as ongoing flash management operations, trim operations received from host system, and the like. In this way, the GAT bitmap managed by the flash controller may always be up-to-date in the memory system controller SRAM. Further, the copy of the GAT on the host system may be synchronized with the GAT stored on the flash controller, with the GAT bitmap (e.g., GATMAP in FIGS. 3A-B) dynamically keeping track of the changes between the GAT stored on the flash controller and the copy of the GAT on the host system.

For example, the GAT may be 32 GB divided into 16 MB parts, so that there are 2048 GAT parts. With this size, the GATMAP may store a bitmap sized 256 bytes, where each bit in the GATMAP represents if the respective GAT part is valid or not. As discussed above, different operations may result in changes to a GAT part. For example, when the host system reads the GAT part (through the GAT logical partition), the GATMAP sets the relevant bit. As another example, when the firmware on the memory system controller performs an update to a respective GAT part, the GATMAP clears the respective relevant bit (e.g., the GAT bitmap indicates that LBA to PBA translation for the respective GAT subpart is invalid).

As illustrated in FIGS. 3A-B, the host system may send a command, such as a vendor specific command, to the memory system requesting transmission of the GAT. In response, the memory system transmits the GAT (shown in FIG. 3A as 32 MB GAT). Alternatively, the memory system may transmit the GAT unprompted by the host system, as discussed above. Further, the host system, using the GAT resident in the host system, generates the physical address from the logical address. In particular, using the stored GAT image, the host system may be configured to calculate the physical address and provide both logic block address (LBA) and physical block address (PBA) to the flash controller in each read access. In one implementation, the logical address is the logical flash memory unit (LFMU) and the physical address is the physical flash memory unit (PFMU). The LFMU and the PFMU may be sent from the host system to the memory system in a command. For example, the command may be sent in compliance with the eMMC 5.1 protocol with no need to change the standard. In another example, the LFMU and PFMU may be part of a PCI Express direct memory transfer sent asynchronously by the device. For example, this may be part of a Host Memory Buffer as defined by the NVM Express 1.2 standard. In this case, the host system is not required to explicitly fetch GAT updates from the device. In this implementation, the memory system may comprise a bus master on host memory and have host memory allocated specifically for the purpose of storing flash translation layer (FTL) tables, such as an NVMe device with an HMB.

Receiving the command, the flash controller may access the GAT bitmap in order to determine whether to accept or reject the PFMU resident in the command. For example, as shown in FIG. 3A, the flash controller may be configured to check in the GAT bitmap if the specific LBA to PBA translation bit is valid, and if valid (e.g., valid bit=1), to perform the read from the flash according to the received PBA from the host system. In this way, the flash controller may be configured to receive both LBA and PBA from the host system, check whether the PBA is valid in the GAT bitmap, and if the PBA is valid (according to the GAT bitmap) to read according to the PBA, thereby skipping the logic to physical translation. As another example, if the GAT bitmap LBA to PBA translation bit is invalid, the flash controller may perform a GAT read from the flash on the memory system according to the LBA it received from the host system, translate the LBA to PBA, and then read from flash the data, as shown in FIG. 3B. In this way, before an LFMU is read, the command is parsed to determine a PFMU (or a set of PMFUs) are included. If the PFMU is not included, or if the GAT bitmap indicates that the PFMU is invalid, the LFMU in the command is translated using the logical-to-physical address translation map. Otherwise, the PFMU (or a set of PMFUs) in the command are used. For example, a specific PFMU may be for 4 Kb of data. If the host system seeks to read more than 4 Kb of data, a set of PFMU (such as 4 PFMUs to read 16 Kb of data) may be included in the command and processed in sequence by the memory system. In the instance of multiple PFMUs, one, some or all of the PFMUs in a single command sent from the host system may be accepted or rejected based on the GAT bitmap (e.g., a first PFMU in the command may be rejected and a second PFMU may be accepted and used to access the 4 Kb of data). Further, using the GAT bitmap (or other type of update table) may improve read performance (e.g., upwards by about 40%).

Figure 4:
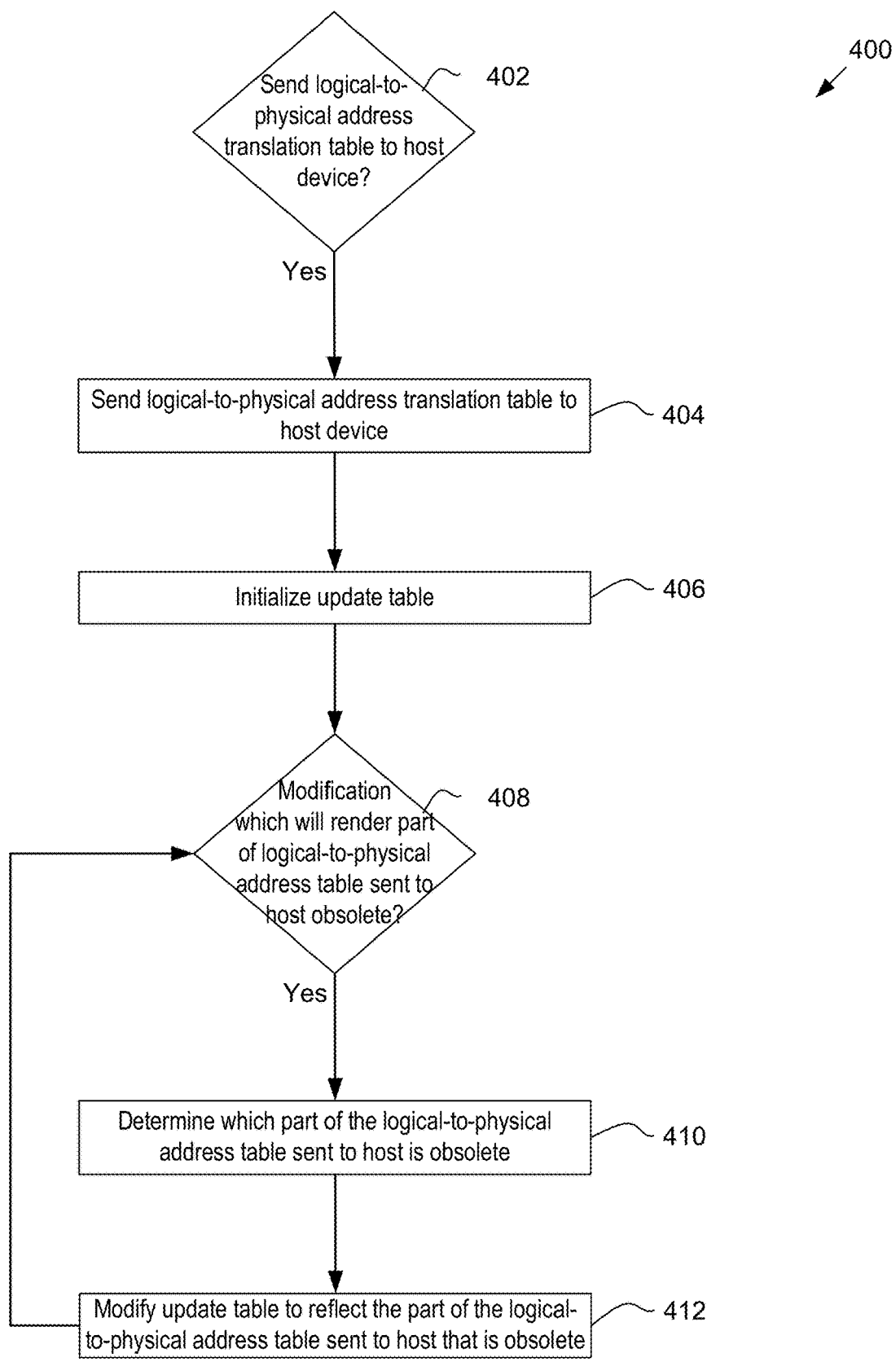
FIG. 4 is a flow chart of an example method of the memory system sending the logical-to-physical translation table to the host, monitoring the logical-to-physical translation table sent, and tracking those changes in an update table.

FIG. 4 is a flow chart 400 of an example method of the memory system sending the logical-to-physical translation table to the host system, monitoring the logical-to-physical translation table sent, and tracking those changes in an update table. As discussed above, the memory system may send a copy of the logical-to-physical translation table to the host system. In one embodiment, the host system prompts the memory system to send the copy of the logical-to-physical translation table to the host system. In an alternate embodiment, the memory system sends the copy of the logical-to-physical translation table to the host system unprompted. In yet another embodiment, the memory system directly accesses host memory in order to update the logical-to-physical translation table. As shown at block 402, the memory system determines whether to send a copy of the logical-to-physical translation table to the host system. In response to determining to send the copy, at 404, the memory system sends a copy of the most recent and updated logical-to-physical translation table to the host system. Further, at 406, the memory system initializes an update table, which may include data that is indicative whether parts of the logical-to-physical translation table have been modified since transmission of the copy to the host system. For those parts of the logical-to-physical translation table that have been modified, the corresponding parts in the copy on the host system may thus be out-of-date and therefore unreliable to perform the logical to physical address translation.

Various operations may result in modification of a portion of the logical-to-physical translation table. As one example, an external operation, such as a command from the host system to rewrite data on the memory system, may result in a modification of a part of the logical-to-physical translation table. As another example, an internal operation, such as the memory system performing garbage collection, may likewise result in a modification of a part of the logical-to-physical translation table. At 408, the memory system determines whether there is a modification to a part of the logical-to-physical address table, thus rendering that part of the logical-to-physical address table in the host system obsolete. At 410, in response to determining in the affirmative, at 410, the memory system determines the part of the logical-to-physical address table copy on the host system that is obsolete. At 412, the memory system then modifies the update table to reflect the part of the logical-to-physical address table sent to the host system that is obsolete. As discussed in more detail below, the update table is thereafter used to determine whether to accept or reject the physical address sent from the host system. For example, in response to the memory system determining that an operation (external or internal) results in change to a specific part of the logical-to-physical address table, the update table may indicate, for the specific part of the memory, that a change has occurred, and thus further indicating that the copy of the logical-to-physical address table on the host system is obsolete with regard to the specific part of memory.

Figure 5:
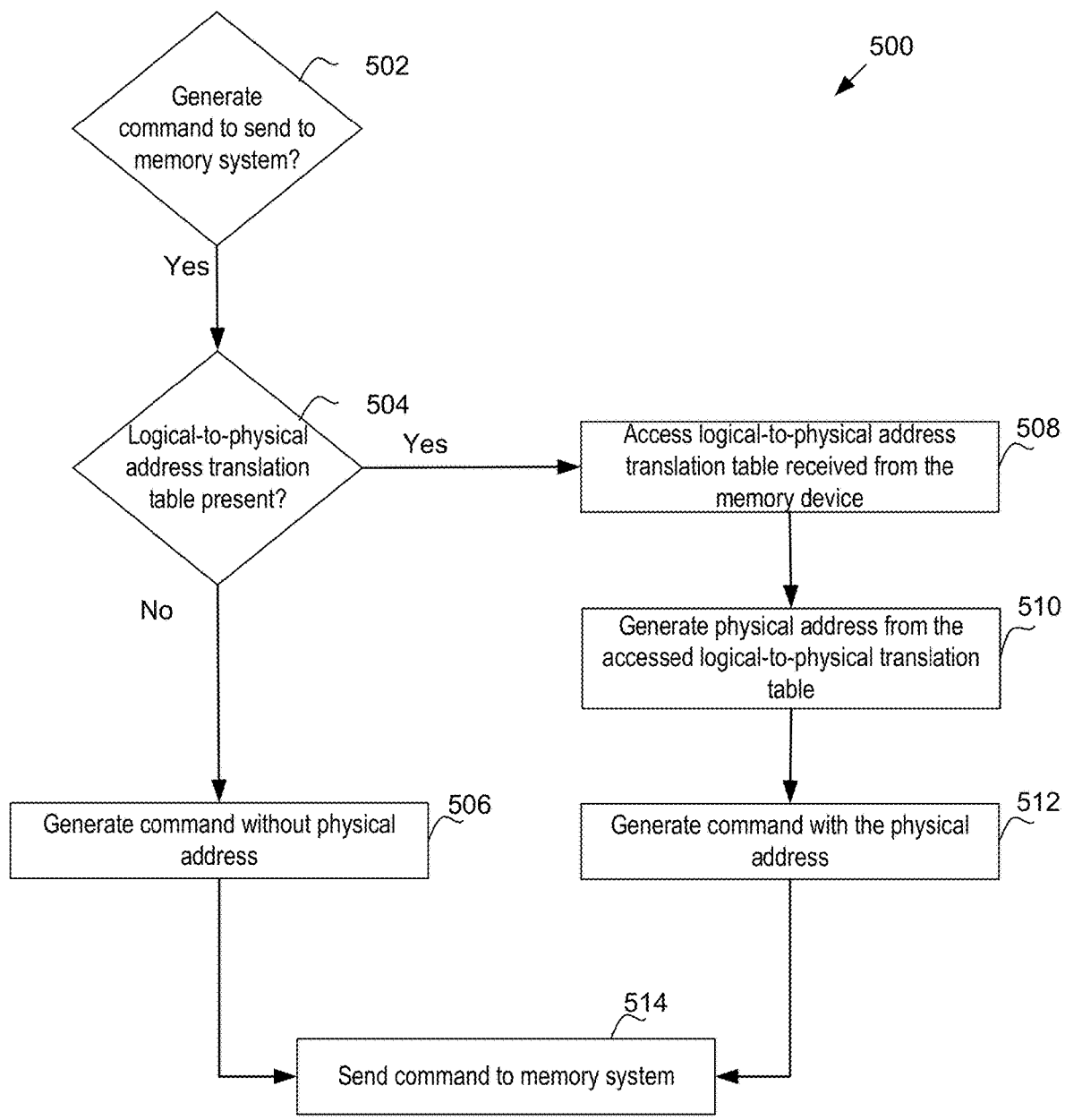
FIG. 5 is a flow chart of an example method of the host system determining whether to include the physical address in a command sent to the memory system.

FIG. 5 is a flow chart 500 of an example method of the host system determining whether to include the physical address in a command sent to the memory system. At 502, the host system determines whether to generate a command to send to the memory system. If so, at 504, the host system determines if there is a copy of the logical-to-physical address translation table present in the host system. If not, at 506, the host system generates the command without the physical address included and with the logical address included. If so, at 508, the host system accesses the logical-to-physical address translation table present in the host system. At 510, the host system, using the accessed logical-to-physical address translation table and the logical address, generates the physical address. At 512, the host system generates the command with the physical address included therein. In one example, the host system may include the physical address in one or more fields of the command, such as a metadata field. In particular, an arbitrary vendor specific command may allow any vendor to utilize metadata to include the physical address. Alternatively, apart from metadata, eMMC, UFS standards, or other protocols may allow for inclusion of the physical address in other parts of the command. At 514, the host system sends the command to the memory system.

Figure 6:
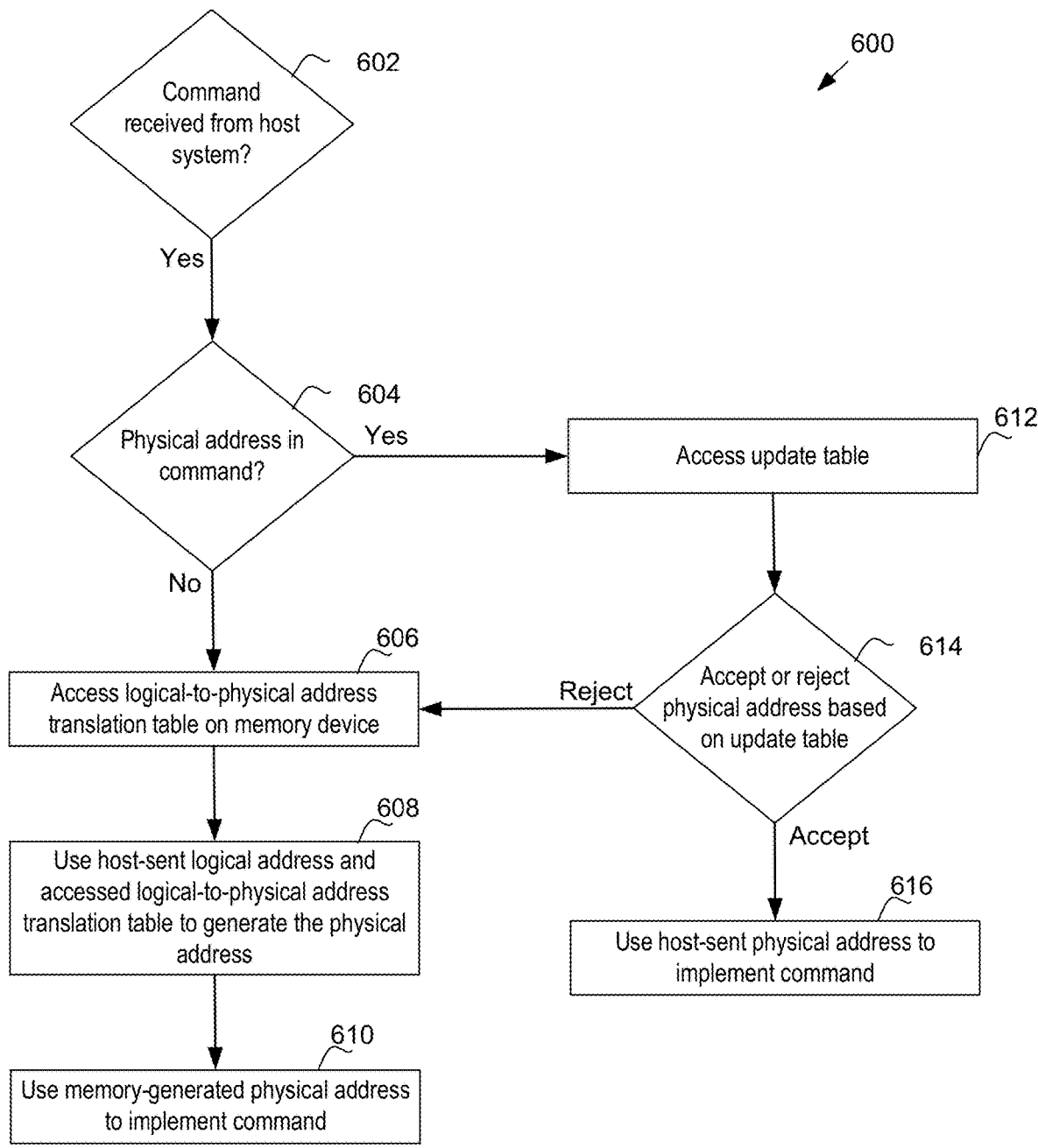
FIG. 6 is a flow chart of an example method of the memory system determining whether to accept or reject using the physical address sent from the host system.

FIG. 6 is a flow chart 600 of an example method of the memory system determining whether to accept or reject using the physical address sent from the host system. At 602, the memory system determines whether a command is received from the host system. If so, at 604, the memory system determines whether a physical address is included in the command (e.g., in the metadata of the command). If not, at 606, the memory system accesses the logical-to-physical address translation table resident on the memory system. At 608, the memory system uses the logical address (that was sent from the host system and included in the command) and the accessed logical-to-physical address translation table to generate the physical address. At 610, the memory system uses the physical address generated by the memory system in order to implement the command (e.g., perform a read or a write).

If the command includes a physical address, at 612, the update table is accessed. At 614, the memory system determines whether to accept the physical address sent from the host system based on the update table. As discussed above, if the update table indicates that the part of the table that includes the specific physical address sent from the host system is updated so that the part of the translation table on the host system is obsolete, the memory system may reject using the physical address from the host system and perform the address translation itself using 608 and 610. If the update table indicates that the part of the table that includes the specific physical address sent from the host system is not updated so that the part of the translation table on the host system is not obsolete, at 616, the memory system may use the physical address sent from the host system to implement the command. As part of the completion of the command, the memory system may also update the host system with a corrected physical address. For example, if a write command to a specific LBA range causes a new mapping to be created, the memory system may update the host copy of the logical-to-physical table as part of command completion.

Lastly, as mentioned above, any suitable type of memory can be used. Semiconductor memory systems include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory system may have different configurations. For example, flash memory devices may be configured in a NAND or a NOR configuration.

The memory systems can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for address translation in a memory system, the method comprising:

sending a copy of a file management table to a host system, the file management table configured to be used for managing at least one aspect of a file in the memory system;
monitoring changes to one or more sections of memory in the memory system;
updating a data structure based on the monitored changes;
receiving, from the host system, a command, the command including file management data and indicative of a request to perform an action; and
responsive to receiving the command:
  determining, based on the data structure, whether to use the file management data to perform the action;
  in response to determining to use the file management data to perform the action, using the file management data to perform the action; and
  in response to determining not to use the file management data to perform the action, accessing internal file management data to perform the action;
analyzing the data structure to determine an extent of the monitored changes; and
in response to the extent of the monitored changes exceeding a threshold, sending a batch of updates including an updated copy of at least a part of the file management table to the host system, wherein the updated copy indicates the monitored changes;
wherein the monitored changes are not sent to the host if the extent of the monitored changes does not exceed the threshold.

2. The method of claim 1, wherein the file management table comprises an address translation table.

3. The method of claim 2, wherein the file management data comprises a specific logical address and a specific physical address;
wherein determining, based on the data structure, whether to use the file management data to perform the action comprises determining whether to use the specific physical address to perform the action; and
further comprising, in response to determining not to use the file management data to perform the command, using the specific logical address to access a local address translation table to generate a physical address.

4. The method of claim 3, wherein the data structure correlates different sections of memory in the memory system to an indicator of change since sending of the copy of the address translation table to the host system.

5. The method of claim 4, wherein determining, based on the data structure, whether to use the specific physical address to perform the action comprises:
determining a specific section of memory correlated to the specific physical address;
determining, based on the specific section of memory, whether a specific indicator, correlated in the data structure to the specific section of memory, is indicative of change since sending of the copy of the address translation table to the host system;
in response to determining that the specific indicator is indicative of no change since sending of the copy of the address translation table to the host system, determining to use the specific physical address received from the host system to perform the action; and
in response to determining that the specific indicator is indicative of change since sending of the copy of the address translation table to the host system, determining not to use the specific logical address received from the host system to perform the action.

6. The method of claim 2, wherein monitoring changes to physical addresses in sections of memory in the memory system comprises monitoring operations internal to the memory system that result in updates to the address translation table resident on the memory system.

7. The method of claim 2, wherein monitoring changes to physical addresses in sections of memory in the memory system comprises monitoring commands from the host system that result in updates to the address translation table resident on the memory system.

8. The method of claim 1, further comprising:
determining, based on the data structure, whether to send the updated copy; and
responsive to determining to send the updated copy, sending the updated copy.

9. The method of claim 1, wherein the memory system sends the updated copy of the at least a part of the file management table without request by the host system and without notice to the host system.

10. The method of claim 1, wherein:
the data structure is analyzed in response to receiving a request from the host system; and
the host system is configured to send the request in response to the host system determining that a predetermined number of hardware cycles have occurred since receipt of the copy of the file management table.

11. The method of claim 1, wherein:
the updated copy of the at least a part of file management table is sent asynchronously without the host system being notified by the memory system; and
the host system accesses the updated copy of the at least a part of file management table as a background operation.

12. A memory system comprising:
a communication interface configured to communicate with a host system;
a memory configured to store a memory management data construct, the memory management data construct configured to generate memory management input; and
a processor in communication with the communication interface and configured to:
  send, via the communication interface, a copy of the memory management data construct to the host system;
  monitor changes in the memory;
  modify, based on the monitored changes, a memory management update data construct, the memory management update data construct configured to indicate updates to the memory management data construct since sending the copy of the memory management data construct to the host system;
  receive, from the host system via the communication interface, specific memory management input, the specific memory management input being generated based on the copy of the memory management data construct previously sent;
  determine, based on the memory management update data construct, whether to accept or reject the specific memory management input;
  in response to determining to accept the specific memory management input, use the specific memory management input for memory management of the memory system;
  in response to determining to reject the specific memory management input, generate, by the memory system, updated specific memory management input for memory management of the memory system;

receive a request from the host system for a batch update to at least a part of the memory management data construct, wherein the host system is configured to send the request in response to the host system determining that a predetermined number of hardware cycles have occurred since receipt of the copy of the memory management data construct; and in response to receiving the request, send the batch update to the at least a part of the memory management data construct to the host system only if an extent of the monitored changes exceeds a threshold, wherein the monitored changes are not sent to the host system if the extent of the monitored changes does not exceed the threshold.

13. The memory system of claim 12, wherein the memory comprises volatile and non-volatile memory.

14. The memory system of claim 12, wherein the memory management data construct comprises a logical-to-physical address translation table.

15. The memory system of claim 12, wherein the specific memory management input comprises a physical address.

16. The memory system of claim 12, wherein the updated specific memory management input comprises a physical address generated by the memory system.

17. A memory system comprising:

means for transmitting an address translation table to a host device;

means for receiving a command from the host device, the command comprising a specific logical address and a specific physical address, and indicative to the memory system to perform an action;

means for determining whether to use the specific physical address to perform the action;

means for, in response to determining not to use the specific physical address:

accessing a local address translation table resident in the memory system to identify a different physical address based on the specific logical address, wherein the local address translation table is an updated version of the address translation table transmitted to the host device, and using the different physical address to perform the action; and means for sending at least a part of the local address translation table to the host device asynchronously without notifying the host device only if an extent of monitored changes exceeds a threshold, wherein the monitored changes are not sent to the host device if the extent of the monitored changes does not exceed the threshold, and wherein the host device is configured to access the at least a part of the local address translation table as a background operation.

18. The memory system of claim 17, further comprising means for updating a data structure based on monitored changes in the address translation table since transmission to the host device; and wherein the means for determining whether to use the specific physical address is configured to determine whether to use the specific physical address based on the data structure.

19. The memory system of claim 18, further comprising means for, in response to the means for determining whether to use the specific physical address determining not to use the specific physical address, using the specific logical address in the command to perform the action.

* * * * *